Oct. 13, 1931.  A. H. PASCOE  1,827,437

METHOD OF MAKING REENFORCED DRILL PIPE CASINGS

Filed Dec. 7, 1929

INVENTOR.
Alfred H Pascoe

Patented Oct. 13, 1931

1,827,437

UNITED STATES PATENT OFFICE

ALFRED H. PASCOE, OF LOS ANGELES, CALIFORNIA

METHOD OF MAKING REENFORCED DRILL PIPE CASINGS

Application filed December 7, 1929. Serial No. 412,403.

This invention relates to a method for economically producing strong, reenforced drill pipe casings such as are in use in oil well drilling operations.

Another object thereof is to provide a simple method of producing any length of drill pipe casing from relatively thin sheet metal sections which are designed to be so nested and arranged, in carrying out the method as to provide a double-walled casing held together by a press fit.

A further object thereof is to press out from the double walls of the casing to be formed, progressively in the act of forming the same, concavo-convex corrugations so disposed in two opposing series that one series of screw shaped corrugations will intersect the other series.

A still further object of this method is to resistance weld the abutting or contacting edges of the tubular sections of the casing that have been rolled out and to cause the intermeshing corrugations of the double walls of the casing to be welded together intimately to provide a more rigid whole.

With the above and other objects in view I have disclosed herein the various details of my method such as the same is to be practiced, reference being had to the accompanying drawings.

I will now describe my method. I take sheet metal plates and roll them into tubular formation to provide the casing sections 10 or 11, the diameter of the sections 11 being greater than that of the sections 10 so that one series of tubular sections may be telescoped in the others.

Figure 4:
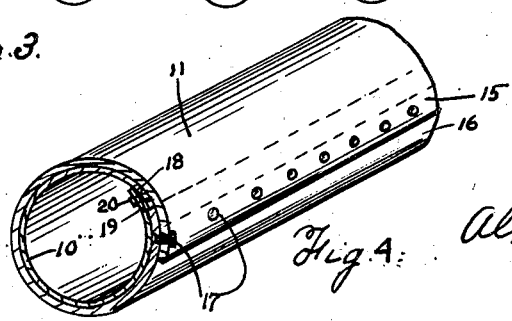
Figure 4 is a perspective sectional view of the nested parts of the tubular casing.

Thus one section 11 is formed by being rolled into tubular shape as shown in Figure 4 so that its edges 15 and 16 will overlap longitudinally which overlapping edges may now be riveted firmly together as at 17. The section 11 may be the outer section and from Figure 4 it will be seen that the inner tubular section 10 also has its overlapping marginal edges 18 and 19 riveted together at 20.

Figure 1:
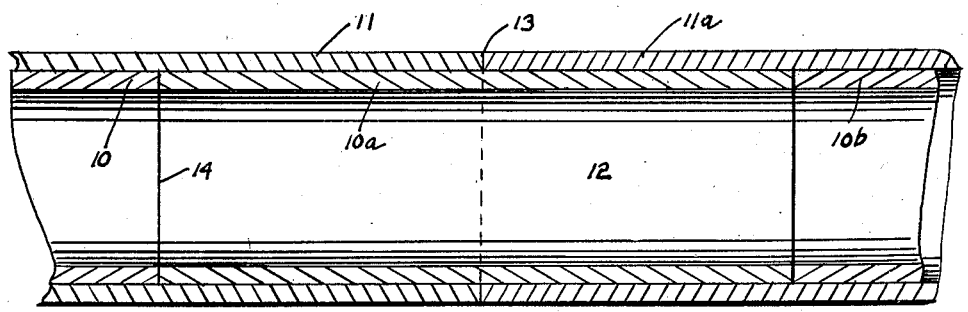
Figure 1 is a longitudinal section of the casing.
Figure 2:
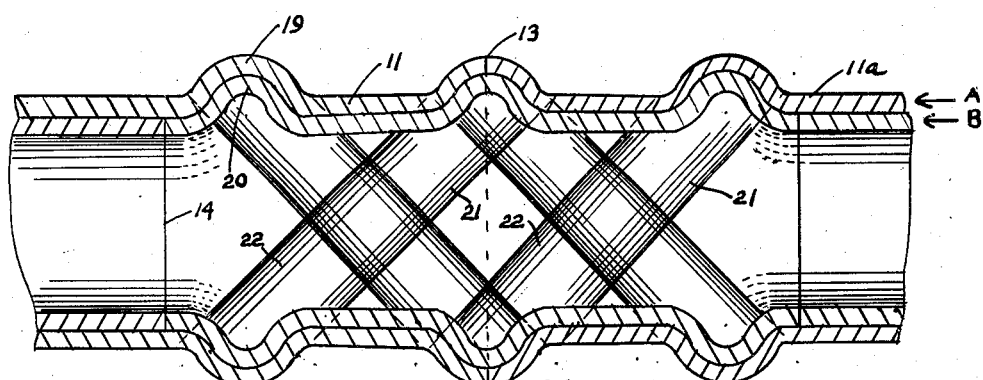
Figure 2 is a similar section of the casing after the same has been corrugated.
Figure 3:
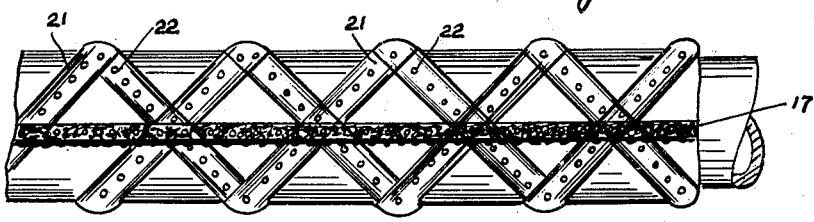
Figure 3 is a plan view of the finished casing.

The next step of my method is to insert the tubular and rolled sections 10 into the larger sections 11 so that they will be nested together under a press fit in telescoping relation and in a manner to cause the inner sections 10 to be staggered with reference to the outer sections 11. This arrangement assures that each section 10 will abut with the next adjacent section 10a, 10b with their edges abutting endwise, the same arrangement being carried out as applies to the outer sections 11, 11a, etc. In this manner the two series of inner and outer tubular sections break joints and provide a satisfactory air seal for the passage 12 of the finished casing. The next step of my method is to employ suitable instrumentalities for the purpose of pressing out progressively fluted portions or corrugations upon the double walls A and B of the casing, these corrugations being formed screw-shaped longitudinally of the casing so that the casing is grooved out spirally, the convex surfaces of the grooves being externally arranged and the concave surfaces thereof being internally arranged. The corrugations are designated 19 on the sections 11 and 20 on the sections 10, and they intermesh snugly. One series of corrugations 22 are threaded upon both walls A and B from right to left thereof and the other series of the corrugations 21 are threaded in a reverse order so as to intersect the first set producing X-shaped but rounded reinforcing members upon the casing that makes the same very strong. The outer overlapping edge 18 of sections 10 contact the inner overlapping edge 16 of the other sections. The next step of my method consists in resistance welding progressively the line where the overlapping edges of the walls A and B of the casing engage both internally and externally to assist in providing a homogeneous strong mass. When desired the outer and inner corrugations 19 and 20 may be secured by welded points 22 as indicated in Fig. 3 of the drawings. It is within the contemplation of my invention to provide a single length of casing from a single series of sections 10 or 11, then fluting and riveting and otherwise finishing the single wall casing as already described. I do not limit my method to the exact expedients employed in carrying out the same save as set forth in the appended claims.

What I desire to claim and secure by Letters Patent is:—

1. The method of producing drill pipe casings which consists in nesting telescoping tubular sections in a manner to provide an outer and an inner length of metal tubing, the inner sections being staggered with relation to the outer sections and both the outer and inner sections having their opposing edges abutting, next upsetting both lengths of metal tubing internally to produce intersecting rows of spiral beads longitudinally of both tubings, and lastly resistance-welding the spiral beads as they are progressively made.

2. The method of producing drill pipe casings which consists in assembling a length of two tubings in a manner to cause one tubing to be nested in the other telescopically, then turning both tubings in nested relation and forming conjoint spiral corrugations upon both tubings in two pairs of rows, one pair of rows of corrugations being of an opposite pitch to the other pair of rows and intersecting the other, next riveting the two tubings separately one from the other and lastly resistance welding the rows of corrugations and the rows of rivets.

3. The method of producing a reenforced drill pipe casing which consists in rolling sheet metal plates into tubular formation, then assembling the tubular parts in nested relation, thereafter introducing internally of the tubular parts a twisting operation and forming spiral corrugations upon said tubular parts of a concavo-convex shape, then riveting the overlapping faces of said tubular parts and lastly welding the intermeshing spiral corrugations together.

4. The method of producing stout drill pipe casings which consists in rolling into tubular form sheet metal plates to provide sleeves, causing a plurality of said sleeves to abut endwise to provide a lengthened pipe, then inserting a second sectional pipe into the first pipe in staggered relation with the sections thereof abutting endwise, thereafter turning said nested pipes to produce oppositely sloping corrugations upon them which intersect, and lastly welding the abutting edges of said pipes as well as the intermeshing corrugations.

5. The method of producing a stout drill-pipe casing which consists first in rolling metal plates into pipe formation with overlapping edges, next telescoping one rolled pipe into the other with one longitudinal edge of one abutting the adjacent edge of the other to produce a double-walled casing, next straining the double walls of said casing to produce two series of helical corrugations, the corrugations of one series intersecting those of the other, and lastly welding the interior and exterior free longitudinal edges of the casing.

6. The method of producing a stout drill pipe casing which consists of nesting one series of endwise abutting tubular sections into another series of similarly abutting sections with the abutting edges of one series staggered with respect to the other series, next upsetting both series of tubular sections to provide screw-shaped corrugations longitudinally thereof to hold the sections into an integral mass, and lastly welding the abutting edges of the two series of sections together as well as welding the inter-contacting corrugations.

7. The method of making drill pipe casings which consists in rolling metal plates into two diameters of tubular sections, next interfitting the sections of one diameter into those of a larger diameter so two series of sections are adjoined edgewise, one in staggered order with respect to the other to provide telescoping pipes held to each other with a press fit, next rolling said pipes to press out screw-shaped beads thereon longitudinally thereof, extending in reverse order and in opposite pitches in intersecting relation, and thereafter resistance welding the abutting, overlapping surface of the assembled units.

8. The method of producing drill pipe casings which consists in first rolling sheet plates into tubular sections having overlapping edges, but in two series of varying diameters, then interfitting the sections of one series upon those of the other series with abutting edges in staggered relation, thereby producing a double-walled frictionally interconnected casing, next corrugating the double walls of the casing in screw formation longitudinally from left to right thereof, next similarly corrugating the double walls in screw formation, but in a reverse direction so as to intersect the first series of corrugations, and lastly welding the overlapping edges of each line of abutting sections together internally and externally of the casing.

9. The method of making a reenforced drill pipe casing which consists in first rolling metal plates to produce tubular sections, then riveting the overlapping edges of said sections, next producing another series of rolled tubular sections of a diameter to receive snugly the first line of sections, then riveting the overlapping edges of the second line of sections, next introducing one line of sections into the other in staggered relation thereto, to produce a lengthened casing, next pressing out of the casing from end to end thereof X-shaped corrugations formed spirally convex externally and concave internally in a continuous uninterrupted series, and lastly welding the riveted edges of the casing and the seams of the spiral corrugations.

In witness whereof he has hereunder set his hand this 5th day of November, 1929.

ALFRED H. PASCOE.